(12) United States Patent
Wang et al.

(10) Patent No.: US 8,107,976 B2
(45) Date of Patent: Jan. 31, 2012

(54) ACCOUNTING METHOD FOR ULTRA MOBILE BROADBAND ACCESS NETWORK

(75) Inventors: Wei Wang, Shenzhen (CN); Ri Yang, Shenzhen (CN); Xiaowu Zhao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 133 days.

(21) Appl. No.: 12/678,972

(22) PCT Filed: Dec. 25, 2007

(86) PCT No.: PCT/CN2007/003778
§ 371 (c)(1),
(2), (4) Date: Mar. 18, 2010

(87) PCT Pub. No.: WO2009/036632
PCT Pub. Date: Mar. 26, 2009

(65) Prior Publication Data
US 2010/0195598 A1     Aug. 5, 2010

(30) Foreign Application Priority Data
Sep. 18, 2007  (CN) .......................... 2007 1 0153029

(51) Int. Cl.
*H04Q 7/20* (2006.01)
(52) U.S. Cl. ......... 455/458; 455/439; 455/438; 370/331
(58) Field of Classification Search ................... 455/458, 455/439, 438; 370/331
See application file for complete search history.

(56) References Cited

U.S. PATENT DOCUMENTS

| | | | |
|---|---|---|---|
| 6,329,902 B1 * | 12/2001 | Lee et al. ..................... | 340/7.27 |
| 7,894,831 B2 * | 2/2011 | Ryu et al. ..................... | 455/458 |
| 7,920,510 B2 * | 4/2011 | Kim .............................. | 370/328 |
| 7,920,521 B2 * | 4/2011 | Xiang et al. .................. | 370/331 |
| 7,978,638 B2 * | 7/2011 | Kim et al. ..................... | 370/311 |
| 8,014,377 B2 * | 9/2011 | Zhang et al. .................. | 370/349 |
| 2005/0282562 A1 * | 12/2005 | Lee et al. ...................... | 455/458 |
| 2008/0139206 A1 * | 6/2008 | Touray et al. ................. | 455/437 |

FOREIGN PATENT DOCUMENTS

| | | |
|---|---|---|
| CN | 1984050 | 6/2006 |
| CN | 1870773 | 11/2006 |
| WO | 2006/052083 | 5/2006 |
| WO | 2007/052323 | 5/2007 |

OTHER PUBLICATIONS

International Search Report; PCT/CN2007/003778; Y. Jia; Jul. 3, 2008.

* cited by examiner

*Primary Examiner* — Danh Le
(74) *Attorney, Agent, or Firm* — Fish & Richardson P.C.

(57) ABSTRACT

An accounting method for an ultra mobile broadband access network, wherein the method includes: S402, when a data binding point or access gateway AGW triggers a session reference network controller SRNC to initiate the paging to an access terminal AT, the SRNC sends an inter-ANRI signaling paging message to each evolved base station eBS in the paging area of the AT; S404, corresponding to a request from the SRNC, each eBS in the paging area of the AT performs the paging to the AT; S406, the eBS successfully paged an AT establishes the route between the eBS and the AT, creates the Air Link Record for the AT, and sends the accounting request (start) message related to the AT to the AGW serving the AT; and S408, after receiving the accounting request message, the AGW sends an accounting response message to the eBS successfully paged an AT to confirm that the AGW has received the accounting request message.

4 Claims, 6 Drawing Sheets

ACCOUNTING METHOD FOR ULTRA MOBILE BROADBAND ACCESS NETWORK

REFERENCE TO RELATED APPLICATIONS

This application is a national stage application of PCT Application No. PCT/CN/2007/003778 filed on Dec. 25, 2007. PCT Application No. PCT/CN/2007/003778 filed on Dec. 25, 2007 claims the benefit of Chinese Patent Application No. 200710153029.3 filed on Sep. 18, 2007 the disclosure of which is considered part of (and is incorporated by reference in) the disclosure of this application.

FIELD OF THE INVENTION

The present invention relates to communication field, in particular to an accounting method for ultra mobile broadband access network in paging process.

BACKGROUND OF THE INVENTION

The Ultra mobile broadband (UMB) technology is a new technology developed from the CDMA 2000 access technology. Many technologies of the UMB air interface can substantially improve the performance of the CDMA 2000 access technology network and establish an essential base for providing more wireless multimedia service with higher-requirements to users.

In order to support the UMB air interface technology, related network is also under a new evolvement. FIG. 1 shows the network structure supporting the access network of UMB technology in the art, wherein, The access gateway (AGW) provides the "point of IP attachment point" to the packet data network for an access terminal (AT). Thus, the AGW actually is the first jump router for the AT.

An evolved base station (eBS) is the logic entity capable of communicating with an AT on the wireless carrier. For each AT being served, the eBS comprises an access network route instance (ANRI). For each AT, the eBS can play none or more of the following roles: forward link serving eBS (FLSE), reverse link serving eBS (RLSE) and data attachment point (DAP).

The DAP is the bearer-plane point-of-contact for the AT to the AGW for forward-link data. The AGW sends the data and signaling relating to the AT to the DAP. The reverse link data from the AT can either be transmitted to the AGW via the DAP or directly transmitted to the AGW by the RLSE.

The DAP can be relocated to a different eBS during the lifetime of the packet data session based on several factors, such as performance considerations. An example may be to move the DAP when the eBS hosting the DAP is no longer a Route Set member A session reference network controller (SRNC) is responsible for maintaining the session reference with the AT. The SRNC is also responsible for supporting idle state management of the AT, and providing paging control functions when the AT is in the idle state. For each AT being supported, the SRNC contains a session anchor ANRI.

It is noted that the SRNC can be implemented in various ways, such as being a standalone entity or being collocated in an eBS or in an AGW. If the SRNC is collocated with the eBS, then both of them can share one ANRI.

In the network structure as shown in FIG. 1, reference point U1 is used to carry the control plane and bearer plane information between the eBS and the AGW; reference point U2 is used to carry the control plane information between the SRNC and the eBS; reference point U3 is used to carry the control plane and bearer plane information between two eBSs; reference point U4 is used to carry the control plane information between SRNCs; and reference point U6 is used to carry the control plane information between the SRNC and the AGW.

At the same time, an accounting is a basic function required by a wireless communication network. The access network supporting the UMB should also have such a function. The accounting principle of the UMB network is that the eBS sends the accounting information of wireless resources to the AGW, and the AGW forwards the information to the Authentication Authorization Accounting (AAA) unit of the core network so as to generate, in a unified way, user accounting records for users.

Current access network technology already contains accounting function in some aspects, for example, when a UMB session is established or when an eBS is removed from the Route Set of a certain AT, the eBS sends the related accounting information to the AGW. However, some aspects are ignored in the art. That is to say, there is no accounting information interaction in the following processes or application.

As shown in FIG. 2, there is no accounting function for the current process of the eBS paging the AT triggered due to the AGW having data to be transmitted to the idle AT. As shown in FIG. 2, the current process of the eBS paging the AT triggered due to the AGW having data to be transmitted to the idle AT comprises the following steps:

S202, the connection between the AT and the FLSE has been closed; the AT, the SRNC and the eBS4 (DAP) are all in idle state; the eBS4 (DAP) can perform flow control to trigger the AGW to buffer data.

S204, when the data or data notification of the AT is received from the AGW, the eBS4 (DAP) is triggered to send a paging.

S206, the eBS4 (DAP) sends an inter-ANSI signaling (IAS)—paging request message to the SRNC, wherein the message contains paging priority, flow control status at the AGW, and a flag identifying that the paging area is unknown and needs to be temporarily acknowledged. The eBS4 (DAP) initiates a timer Tpgack_ias and waits for an IAS-Paging Request Ack message. At the same time, the eBS4 (DAP) also initiates a timer Tpgreg-ias and waits for receiving an IP tunnel (IPT)-notification message.

S208, upon receipt of the IAS-Paging Request message, the SRNC sends an IAS-Paging Request Ack to the eBS4 (DAP). Upon receipt of the IAS-Paging Request Ack, the eBS4 (DAP) stops the timer Tpgack-ias. If the eBS4 (DAP) receives the subsequent data and if the timer Tpgreg-ias does not expire, then the eBS4 (DAP) will stop trying to send other IAS-Paging Request message to the SRNC.

S210, the SRNC determines the paging area and sends the IAS-paging message to each eBS in paging area of the AT. This process assumes that eBS1, eBS2, and eBS3 are all in the paging area. The IAS-Page message contains "Local Fanout Required" set to '0' for no local fanout, implying no IAS-Page ACK message is required. the IAS-Paging message also contains the information on the time for initiating the paging procedure over the air and the priority of the paging request.

S212, eBS1, eBS2 and eBS3 page the AT via a specified channel and time.

S214, the call flow assumes that the AT has received the page sent by eBS1, and responds to the page by performing access procedure, i.e., the AT sends a RouteOpenRequest message to eBS1 to open a route with eBS1.

S216, upon receipt of the RouteOpenRequest message, eBS1 sends the IAS-Session Information Request message with a flag indicating access to the SRNC to request a copy of the session, and at the same time, eBS1 starts a timer Tsir-ias. Upon receipt of the IAS-Session Information Request message with a flag indicating access to the SRNC, the SRNC stops the timer Tpgreg-ias.

S218, the SRNC sends the IAS-Session Information Response message to eBS1, which contains session information and the access network identifier (ANID) of eBS4 (the DAP of the AT). eBS1 stops the timer Tsir-ias after having received the IAS-Session Information Response message.

S220, eBS1 sends a RouteOpenAccept message to the AT, so as to finish the establishment of the route to the AT.

S222, eBS1 completes Key Exchange procedure with the AT. This step can be performed in parallel with step S220.

S224, the AT updates the RouteMap with eBS1 and the SRNC.

After step S220 wherein RouteOpenAccept message has been sent to the AT, eBS1 notifies all access network route instances (ANRIs) in the Route Set and eBS4 (the previous DAP of the AT) that it has become the FLSE of the AT.

S226, eBS1 sends the IPT-Notification message to the SRNC to indicate that eBS1 has become a FLSE, and at the same time, eBS1 starts a timer Tnot-ipt.

S228, upon receipt of the IPT-Notification message, the SRNC sends an IPT-Notification ACK message to eBS1. eBS1 stops the timer Tnot-ipt after receiving the IPT-Notification ACK message.

S230, according to the ANID of eBS1, eBS1 sends the IPT-Notification message to eBS4 to indicate that eBS1 has become an FLSE, and at the same time, eBS1 starts the timer Tnot-ipt.

S232, upon receipt of the IPT-Notification message, eBS4 sends the IPT-Notification ACK message to eBS1, and at the same time, eBS4 stops the timer Tpgreg-ias and enters into a connecting status. eBS1 stops the timer Tnot-ipt after having received the IPT-Notification ACK message.

S234, if the AGW has no buffer data or eBS4 (DAP) has data for the AT, the data of eBS4 (DAP) will be forwarded to the AT through eBS1 which currently is the FLSE.

S236, the eBS1, which currently is the FLSE, becomes the DAP of the AT. This step can occur any time after step S220.

S238, the data from the AGW is forwarded to eBS1 which has become the DAP.

As shown in FIG. 3, there is no accounting function for the current process for paging an AT initiated by the SRNC as a data binding point. As shown in FIG. 3, the current process for paging an AT initiated by the SRNC functioning as a data binding point comprises the following steps:

S302, the connection between the AT and FLSE has been closed. Both the AT and SRNC are in idle state. The SRNC becomes the current DAP through moving the binding of the proxy mobile IP (PMIP) tunnel from the original DAP to the SRNC, and at the same time, the SRNC requests the AGW to buffer data. The original DAP has released all the resources allocated to the AT.

S304, the SRNC is triggered to request paging of the AT when the SRNC receives the data notification of the AT from the AGW.

S306, the SRNC sends the IAS-Paging message to each eBS in paging area of the AT. In this flow, it is assumed that all eBS1, eBS2, and eBS3 are in the paging area. The IAS-Paging message contains a reason information unit with a value of "normal operation", a paging control record information unit for indicating paging priority and whether an acknowledgement is required, and an information unit containing the record of the session status information for the time point when the air interface initiates the paging flow. The SRNC starts one timer Tpgreg-ias for each paging request message sent.

S308, eBS1, eBS2, and eBS3 page the AT via a specified channel and time.

S310, the call flow assumes that the AT has received the page sent by eBS1, and responds to the page by performing access procedure, i.e., the AT sends a RouteOpenRequest message to eBS1 to open a route with eBS1

S312, upon receipt of the RouteOpenReques message, eBS1 sends the IAS-Session Information Request message with a flag indicating access to the SRNC to request a copy of the session, and at the same time, eBS1 starts the timer Tsir-ias. Upon receipt of the IAS-Session Information Request message with a flag indicating access to the SRNC, the SRNC stops the timer Tpgreg-ias.

S314, the SRNC sends the IAS-Session Information ACK message to eBS1, which contains session information and the ANID of the DAP. eBS1 stops the timer Tsir-ias after having received the IAS-Session Information ACK.

S316, eBS1 sends a RouteOpenAccept message to the AT, and thus the establishment of the route to the AT has finished.

S318, eBS1 completes Key Exchange procedure with the AT. This step can be performed in parallel with step S320.

S320, the AT updates the RouteMap with eBS1 and the SRNC.

S322, eBS1 sends the IPT-Notification message to the SRNC to indicate that eBS1 has become an FLSE according to the ANID of the DAP (i.e., the ANID of the SRNC), and at the same time, eBS1 starts the timer Tnot-ipt.

S324, upon receipt of the IPT-Notification message, the SRNC sends an IPT-Notification ACK message to eBS1, and at the same time, the DAP stops the timer Tpgreg-ias and enters into a connection status. eBS1 stops the timer Tnot-ipt after receiving the IPT-Notification ACK message.

AN-initiated DAP selection mode, eBS1/FLSE determines to assume the DAP role, and establishes a PMIP binding with the AGW so that bearer data can be conveyed to the AT. This step can occur anytime after step S314 in AN-initiated DAP selection mode, or after step S316 in AT-assisted DAP hand-off mode S326, if the AT is configured to employ the "DAP switch aided by AT" mode, the AT sends a DAPMoveRequest message to eBS1 to trigger the establishment of the initial PMIP tunnel with the AGW.

S328, for the "AN-initiated DAP selection" mode, eBS1 updates the PMIP binding with the AGW through sending a PMIP-Registration Request message to the AGW. eBS1 starts the timer Trrq-pmip.

S330, the AGW sends a PMIP-Registration Response having a tunnel lifetime to eBS1 to confirm the binding update. The target DAP stops the timer Trrq-pmip.

S332, if the AT has sent the DAPMoveRequest message in S326, eBS1 sends a DAP Assignment message indicating that the establishment of the PMIP tunnel has been finished.

S334, eBS1/DAP sends the IPT-Notification message to the SRNC and starts the timer Tnot-ipt. This message contains the information indicating that eBS1 is the current DAP, and the timestamp of eBS1 for updating the PMIP tunnel with the AGW.

S336, the SRNC sends the IPT-Notification ACK message. eBS1/DAP stops the timer Tnot-ipt.

S338, the data from the AGW is forwarded to eBS1 which has become the DAP.

Based on the above description, the flows mentioned above do not transfer any accounting related information to the AGW, thus these flows are short of function supporting accounting, which is a severe limitation to the real network and is a substantial impairment to operators' benefits.

SUMMARY OF THE INVENTION

In view of one or more of above problems, the present invention provides an accounting method for the ultra mobile broadband access network.

The accounting method for ultra mobile broadband access network according to embodiments of the present invention comprises the following steps: S402, when a data binding point or access gateway AGW triggers a SRNC to initiate the paging to an AT, the SRNC sends an inter-ANRI signaling paging message to each evolved base station eBS in the paging area of the AT; S404, corresponding to a request from the SRNC, each eBS in the paging area of the AT performs the paging to the AT; S406, the eBS successfully paged an AT establishes the route between the eBS and the AT, creates the Air Link Record of the AT, and sends the accounting request (start) message related to the AT to the AGW serving the AT, and indicates the air link having been opened; and S408, after receiving the accounting request message, the AGW sends an accounting response message to the eBS successfully paged an AT.

Wherein, while sending the accounting request message to the AGW, the eBS successfully paged an AT starts the timer of specified time length so as to resend accounting request message to the AGW in case that no accounting response message is received in the specified time length.

Wherein, the eBS successfully paged an AT records the information of the wireless resources occupied by related access terminals through creating the Air Link Record for access terminals, and incorporates accounting start information into the accounting request message being sent to the AGW so as to indicate that the air link has been opened.

The present invention improves the accounting function for an access network supporting the UMB technology so as to improve the accounting function of the entire network which is critical to both operators and users.

BRIEF DESCRIPTION OF THE DRAWINGS

The Drawings are provided for a further understanding of the present invention and form a part of the specification, which are used to explain the present invention with embodiments of the present invention rather than unduly limit the present invention, wherein.

DETAILED DESCRIPTION OF THE EMBODIMENTS

The concrete embodiments of the present invention will be described in detail in connection with the drawings.

Figure 1:
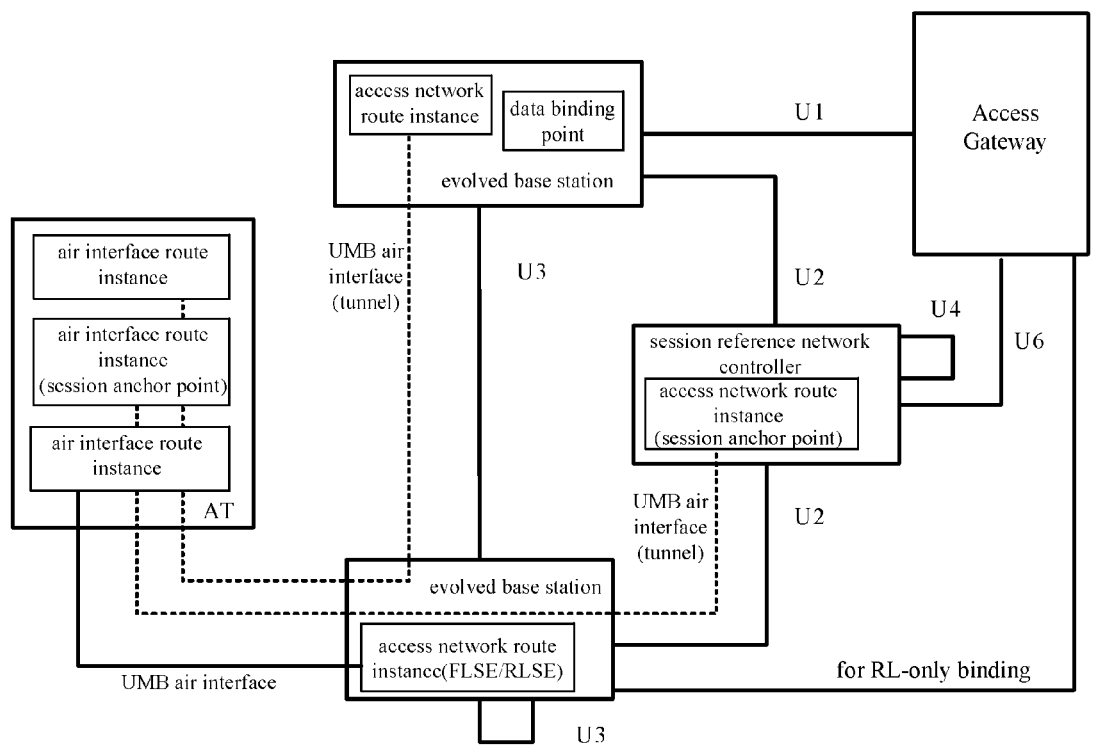
FIG. 1 is a schematic view of the network structure of the UMB access network in the art.
Figure 2:
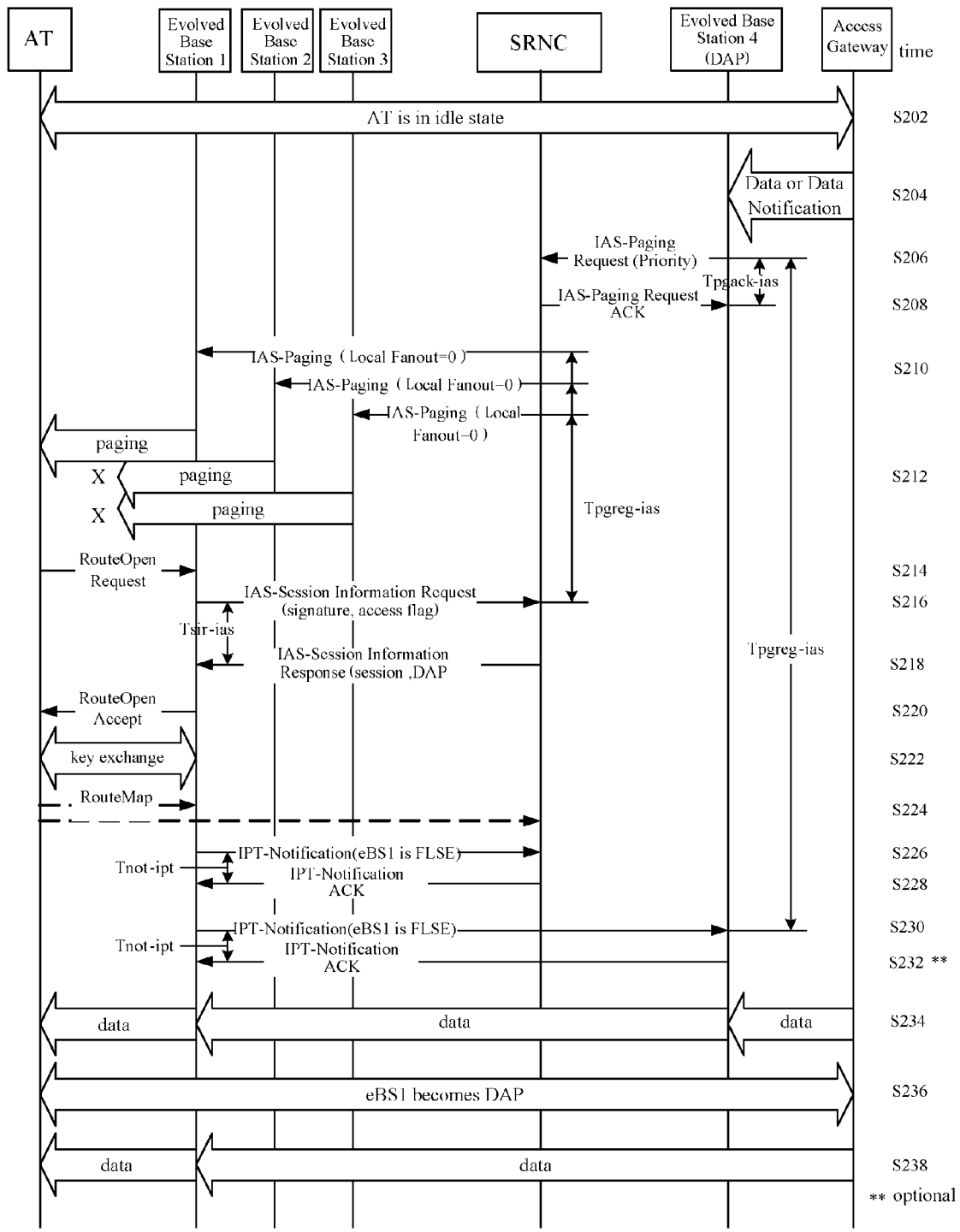
FIG. 2 is a schematic flow chart showing the process of paging an access terminal in the art, which is initiated by the eBS as an AGW triggered data binding point.
Figure 3:
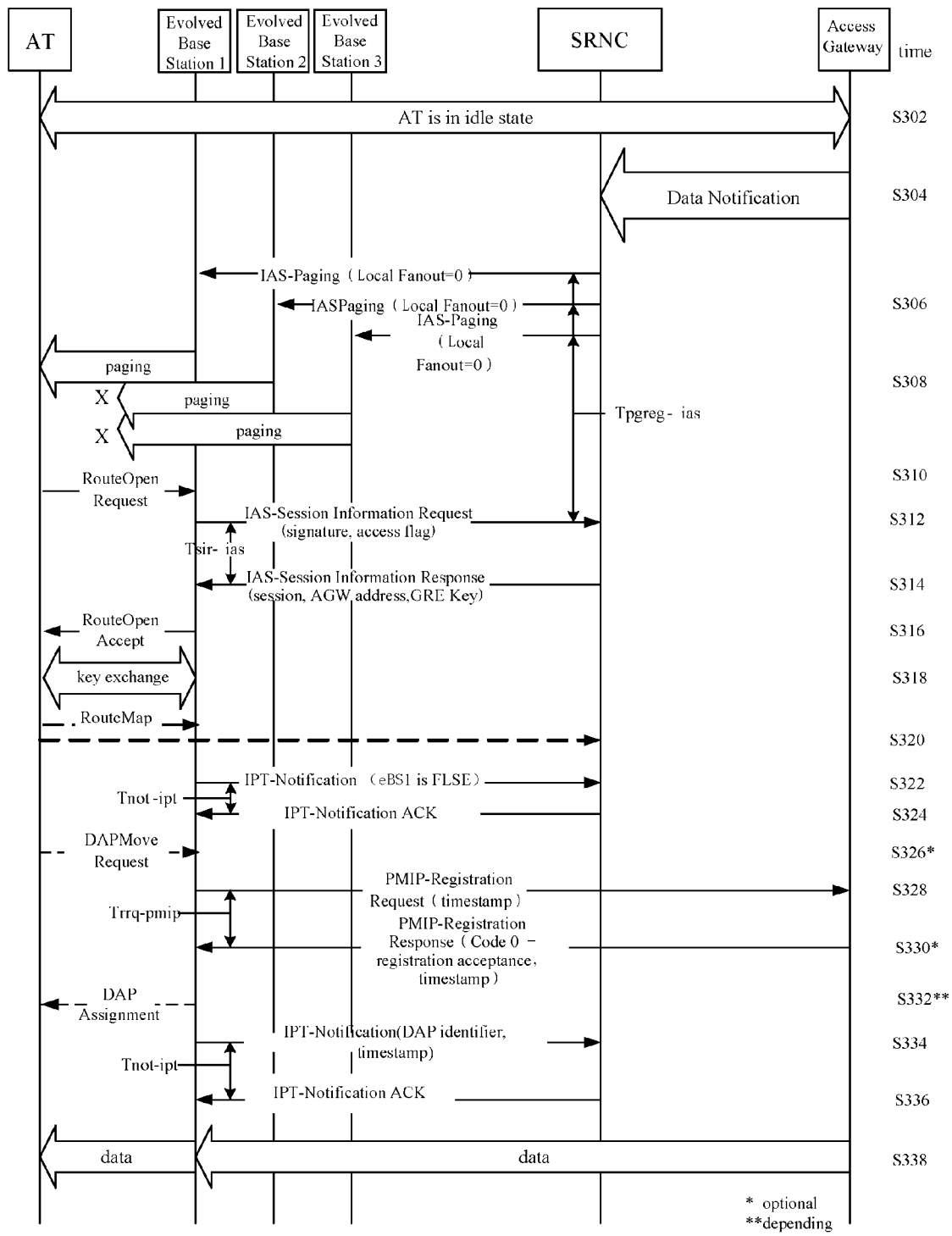
FIG. 3 is a schematic flow chart showing the process of paging an access terminal in the art, which is initiated by the SRNC as a data binding point.
Figure 4:
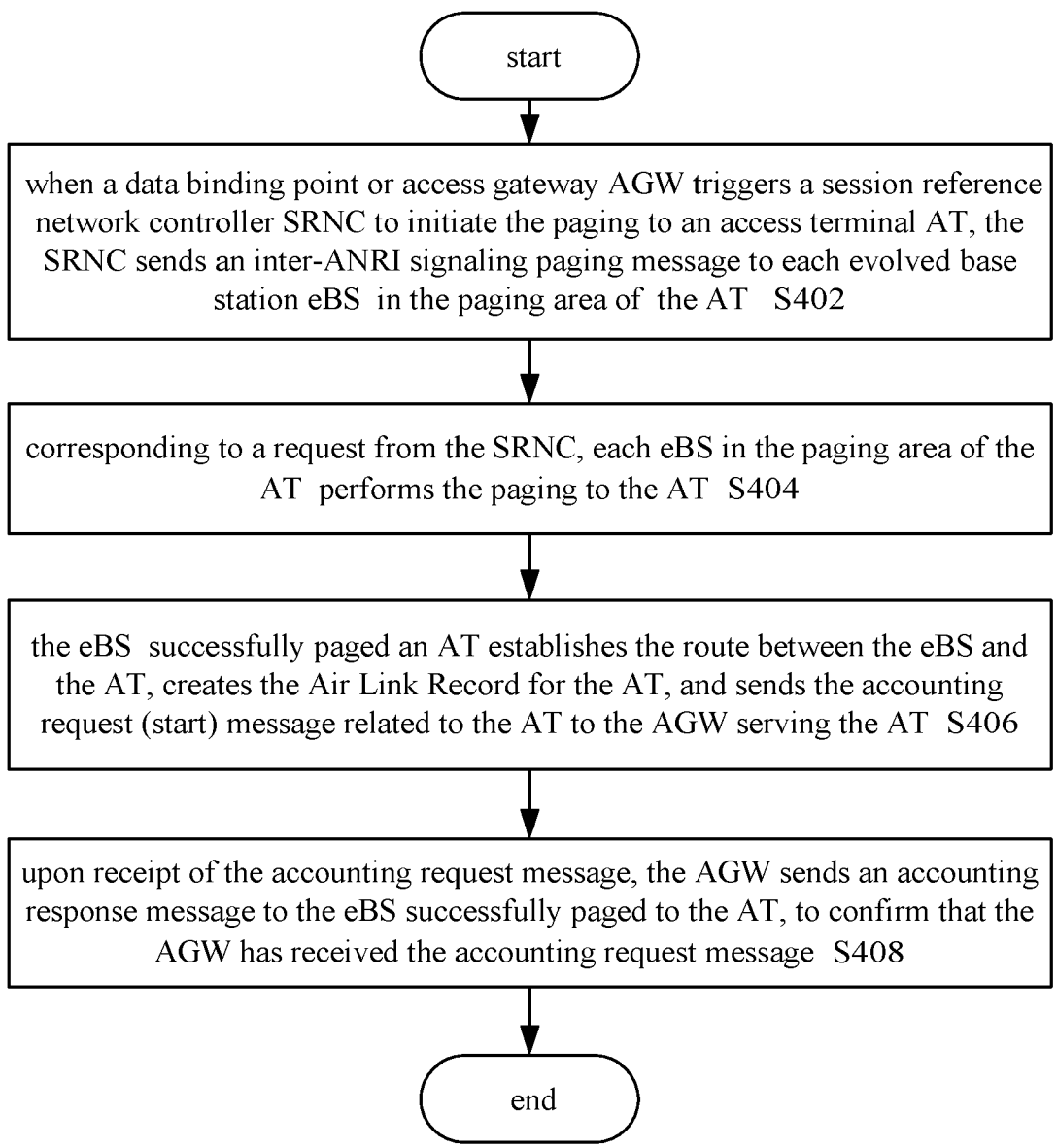
FIG. 4 is a schematic flow chart showing the accounting method for the ultra mobile broadband access network according to the embodiments of the present invention.

Reference is made to FIG. 4, which shows the accounting method for the ultra mobile broadband access network according to the embodiments of the present invention. As shown in FIG. 4, the accounting method comprises the following steps: S402, when a data binding point or access gateway AGW triggers a session reference network controller SRNC to initiate the paging to an access terminal AT, the SRNC sends an inter-ANRI signaling paging message to each evolved base station eBS in the paging area of the AT; S404, corresponding to a request from the SRNC, each eBS in the paging area of the AT performs the paging to the AT; S406, the eBS successfully paged an AT establishes the route between the eBS and the AT, creates the Air Link Record for the AT, and sends the accounting request (start) message related to the AT to the AGW serving the AT; and S408, after receiving the accounting request message, the AGW sends an accounting response message to the eBS successfully paged an AT, to confirm that the AGW has received the accounting request message.

Wherein, when the eBS successfully paged an AT sends the accounting request message to the AGW, the eBS starts the timer of specified time length at the same time so as to resend accounting request message to the AGW in case that no accounting response message is received in the specified time length.

Figure 5:
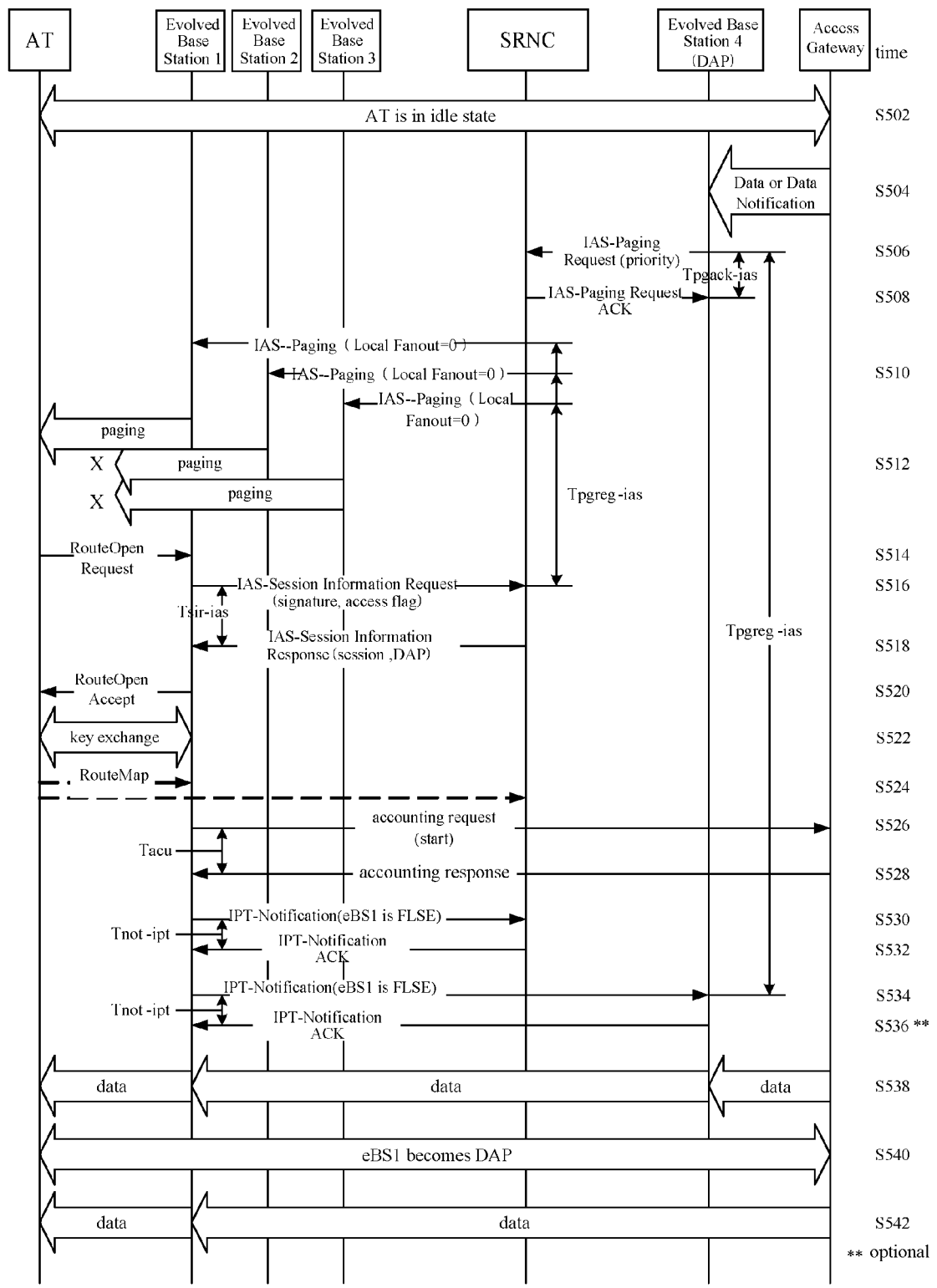
FIG. 5 is a schematic flow chart showing the process of paging an access terminal, which is initiated by the eBS as a data binding point, which includes the process shown in FIG. 4.

Wherein, the eBS successfully paged an AT records the information of the wireless resources occupied by related access terminals through creating Air Link Record for access terminals, and incorporates accounting start information into the accounting request message being sent to the AGW so as to indicate that the air link has been opened Reference is made to FIG. 5, which explains the process of paging an access terminal, wherein the eBS as the data binding point triggers the SRNC to initiate the process, and comprises the process shown in FIG. 4. As shown in FIG. 5, the process comprises the following steps:

S502, the connection between an AT and an FLSE has been closed. The AT, SRNC and eBS4 (DAP) are all in idle stage. eBS4 (DAP) can perform flow control to trigger the AGW to buffer data.

S504, when receiving the data or data notification of the AT, eBS4 (DAP) is triggered to request paging of the AT.

S506, eBS4 (DAP) sends the IAS-Paging Request message to the SRNC with the priority of the page, the status of flow control at the AGW, and a flag indicating the paging area is unknown and needed to be temporarily acknowledged. eBS4 (DAP) starts a timer Tpgack_ias and waits for an IAS-Paging Request ACK message, and at the same time, eBS4 (DAP) also starts a timer Tpgreg-ias, and waits for receiving an IPT-Notification message.

S508, Upon receipt of the IAS-Paging Request message, the SRNC responds with an IAS-Paging Request ACK message to eBS4 (DAP). Upon receipt of the IAS-Paging Request ACK, eBS4 (DAP) stops the timer Tpgack-ias. If eBS4 (DAP) receives the subsequent data, and the timer Tpgreg-ias does not expire, then eBS4 (DAP) will stop trying to send other IAS-Paging Request message to the SRNC.

S510, the SRNC determines the paging area and sends the IAS-Paging message to each eBS in paging area of the AT. This process assumes that eBS1, eBS2, and eBS3 are all in the paging area. The IAS-Page message contains "Local Fanout Required" set to '0' for no local fanout, implying no IAS-Page ACK message is required. the IAS-Paging message also contains the information on the time for initiating the paging procedure over the air and the priority of the paging request.

S512, eBS1, eBS2 and eBS3 page the AT via a specified channel and time.

S514, the call flow assumes that the AT has received the paging sent by eBS1, and responds to the paging by performing access process, i.e., the AT sends a RouteOpenRequest message to eBS1 to open a route with eBS1.

S516, upon receipt of the route RouteOpenRequest message, eBS1 sends the IAS-Session Information Request message with a flag indicating access to the SRNC to request a copy of the session, at the same time, eBS1 starts the timer Tsir-ias. Upon receipt of the IAS-Session Information Request message with a flag indicating access to the SRNC, the SRNC stops the timer Tpgreg-ias.

S518, the SRNC sends the IAS-Session Information Response message to eBS1, which contains session information and the ANID of eBS4 (the DAP of the AT). eBS1 stops the timer Tsir-ias after having received the IAS-Session Information Response S520, eBS1 sends a RouteOpenAccept message to the AT, so as to complete the route establishment with the AT.

S522, eBS1 completes Key Exchange procedure with the AT. This step can occur in parallel with step S520.

S524, the AT updates the RouteMap with eBS1 and SRNC.

S526, eBS1 creates an Air Link Record for the AT and sends the accounting request (start) message to the AGW. eBS1 starts a timer Tacu.

S528, the AGW sends the accounting response message to eBS1, and eBS1 stops the timer Tacu after having received the message.

After having sent the RouteOpenAccept message to the AT in step S520, eBS1 notifies all the ANRI and eBS1 (the previous DAP of the AT) in the Route Set that it has become the FLSE of the AT.

S530, eBS1 sends the IPT-Notification message to the SRNC to indicate that eBS1 has become the FLSE. At the same time, eBS1 starts a timer Tnot-ipt.

S532, upon receipt of the IPT-Notification message, the SRNC responds with an IPT-Notification ACK message to eBS1. eBS1 stops the timer Tnot-ipt after receiving the IPT-Notification ACK message.

S534, according to the ANID of eBS4, eBS1 sends the IPT-Notification message to eBS4 to indicate that eBS1 has become the FLSE. At the same time, eBS1 starts the timer Tnot-ipt.

S536, upon receipt of the IPT-Notification message, eBS4 responds with an IPT-Notification ACK message to eBS1. eBS1 stops the timer Tnot-ipt after receiving the IPT-Notification ACK message.

S538, if the AGW has no buffer data or eBS4 (DAP) has data for the AT, the data of eBS4 (DAP) will be forwarded to the AT through eBS1 which is currently the FLSE.

S540, the eBS1, which is currently the FLSE, becomes the DAP of the AT. This step can occur any time after step S520.

S542, the data from the AGW is forwarded to eBS1 which has become the DAP.

Figure 6:
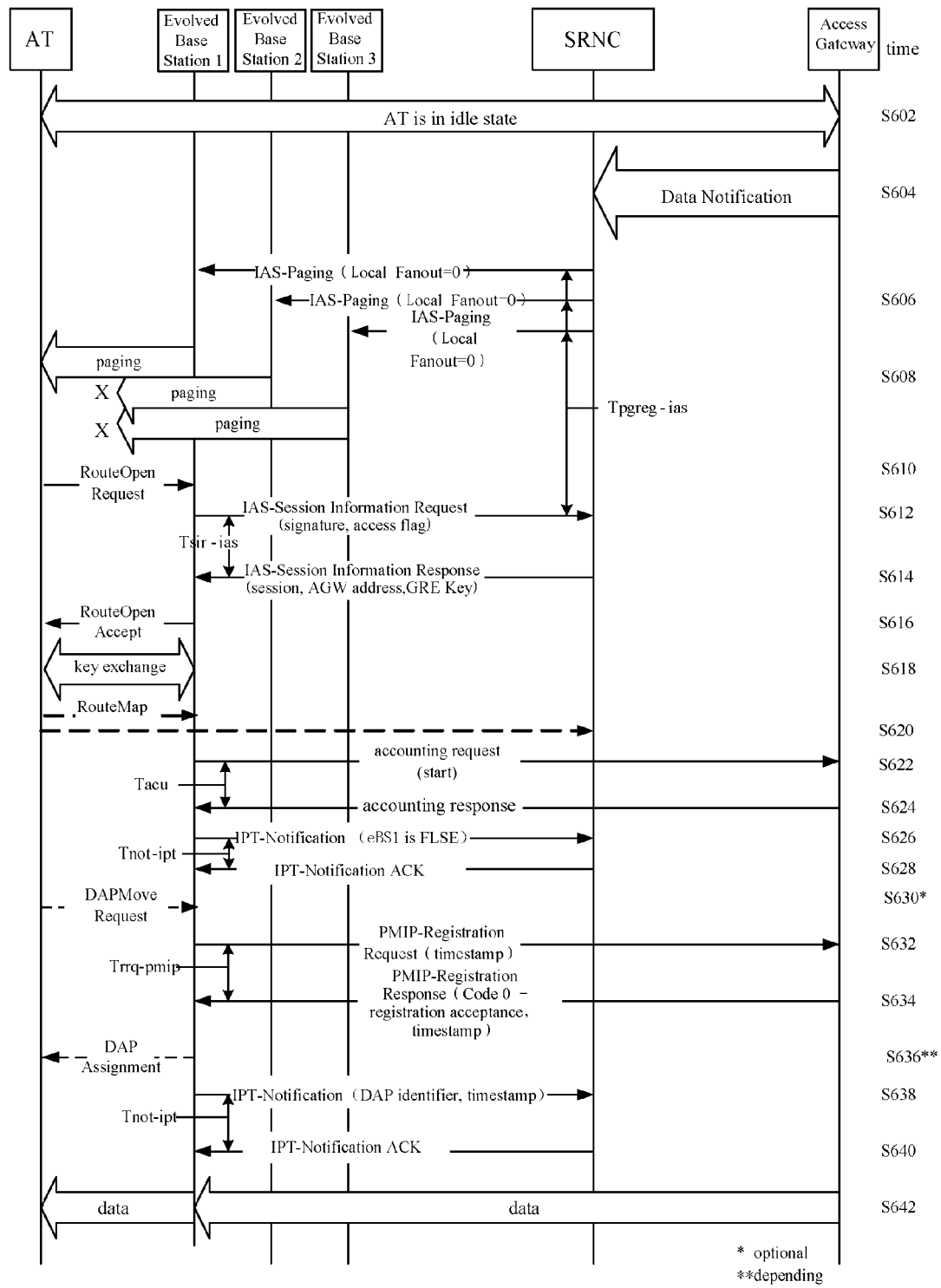
FIG. 6 is a schematic flow chart showing the process of paging an access terminal, which is initiated by the SRNC as the data binding point, which includes the process shown in FIG. 4.

Reference is made to FIG. 6, which explains the process of paging an access terminal, wherein the AGW triggers the SRNC as the data binding point to initiate the process comprising the process shown in FIG. 4. As shown in FIG. 6, the process comprises the following steps:

S602, the connection between an AT and FLSE has been closed. Both the AT and SRNC are in idle state. The SRNC becomes the current DAP through removing the binding of the PMIP from the original DAP to the SRNC, and at the same time, the SRNC requests the AGW to buffer data. The original DAP has released all the resources allocated to the AT.

S604, the SRNC is triggered to request paging of the AT when receiving the data notification of the AT from the AGW.

S606, the SRNC sends the IAS-Paging message to each eBS in paging area of the AT. In this flow, it is assumed that all eBS1, eBS2 and eBS3 are in the paging area. The IAS-Paging message contains a reason information unit whose value is "normal operation", a paging control record information unit indicating paging priority and whether acknowledgement is required, and an information unit containing the record of the session status information for the time when the air interface initiates the paging flow. The SRNC starts one timer Tpgreg-ias for each paging request message sent.

S608, eBS1, eBS2 and eBS3 page the AT via a specified channel and time.

S610, the process assumes that the AT has received the paging sent by eBS1, and responds to the paging by performing access process, i.e., the AT sends a RouteOpenRequest message to eBS1 to open a route with eBS1.

S612, upon receipt of the RouteOpenRequest message, eBS1 sends the IAS-Session Information Request message with a flag indicating access to the SRNC to request a copy of the session, and at the same time, eBS1 starts the timer Tsir-ias. Upon receipt of the IAS-Session Information Request message with a flag indicating access to the SRNC, the SRNC stops the timer Tpgreg-ias.

S614, the SRNC sends the IAS-Session Information Response message to eBS1, which contains session information and the ANID of the DAP. eBS1 stops the timer Tsir-ias after having received the IAS-Session Information Response.

S616, eBS1 sends a RouteOpenAccept message to the AT, so as to complete the route establishment with the AT.

S618, eBS1 completes Key Exchange procedure with the AT. This step can occur in parallel with step S620.

S620, the AT updates the RouteMap with eBS1 and SRNC.

S622, eBS1 creates an Air Link Record for the AT and sends the accounting request (start) message to the AGW. eBS1 starts a timer Tacu.

S624, the AGW sends the accounting response message to eBS1 which stops the timer Tacu after having received the message.

S626, eBS1 sends the IPT-Notification message to the SRNC to indicate that eBS1 has become an FLSE according to the ANID of the DAP (i.e., the ANID of the SRNC), and at the same time, eBS1 starts a timer Tnot-ipt.

S628, upon receipt of IPT-Notification message, the SRNC responds with an IPT-Notification ACK message to eBS1, and at the same time, the DAP stops timer the Tpgreg-ias and enters into connection status. eBS1 stops the timer Tnot-ipt after receiving the IPT-Notification ACK message.

AN-Initiated DAP selection mode, eBS1/FLSE determines to assume the DAP role, and establishes a PMIP binding with the AGW so that bearer data can be conveyed to the AT. This step can occur anytime after step S614 in AN-initiated DAP selection mode, or after step S616 in AT-assisted DAP handoff mode.

S630, if the AT is configured to employ the "DAP switch aided by AT" mode, the AT sends a DAPMoveRequest message to eBS1 to trigger the establishment of the initial PMIP tunnel with the AGW.

S632, for the "AN-initiated DAP selection" mode, eBS1 updates the PMIP binding with the AGW through sending a PMIP-Registration Request message to the AGW. eBS1 starts a timer Trrq-pmip.

S634, the AGW sends the PMIP-Registration Response having tunnel lifetime to eBS1 to confirm the attachment update. The target DAP stops the timer Trrq-pmip.

S636, if the AT sent the DAPMoveRequest t message in S630, eBS1 sends a DAP Assignment message indicating that the establishment of PMIP has been finished.

S638, eBS1/DAP sends the IPT-Notification message to the SRNC and starts a timer Tnot-ipt. The message contains the information indicating that the eBS1 is the current DAP and the timestamp for eBS1 updating the PMIP tunnel with the AGW.

S640, the SRNC sends the IPT-Notification ACK message. eBS1/DAP stops the timer Tnot-ipt.

S642, the data from the AGW is forwarded to eBS1 which has become the DAP.

Due to the importance of the accounting information, in order to ensure that the AGW can accurately receive the accounting information from the eBS, the eBS sets the timer Tacu upon sending the accounting information to the AGW. Wherein, the time length of the timer Tacu can be flexibly configured. If no accounting response message is received from the AGW before the timer expires, the eBS resends the accounting request message. The eBS will stop sending the accounting information if no accounting response message is received from the AGW after repeating the process several times (the number of times of the repetition can be configured in advance). The timer can be used not only in the flow of the present invention but also in any other flow relating to two pieces of accounting information.

Based on the above description, with respect to the fact that there is no accounting process or information relating to the UMB flow in the current UMB access network technology, the present invention provides an accounting information interactive process added to the AT paging flow, so as to improve the technology flow and the accounting function in the UMB access network, which is of essence in real network.

Above description is to illustrate the embodiments of the present invention but not to limit the present invention. Various alterations and changes to the present invention are apparent to those skilled in the art. The scope defined in the claims shall comprise any modification, equivalent substitution and improvement in the spirit and principle of the present invention.

What is claimed is:

1. An accounting method for ultra mobile broadband access network, comprising the following steps,
   S402, sending, by a session reference network controller (SRNC), an inter access network route instance (ANRI) signaling paging message to each evolved base station (eBS) in a paging area of an access terminal (AT), when a data binding point or an access gateway (AGW) triggers the SRNC to initiate a paging to the AT;
   S404, performing, by each eBS in the paging area of the AT, the paging to the AT corresponding to a request from the SRNC;
   S406, establishing, by the eBS successfully paged the AT, a route with the AT, and sending, by the eBS successfully paged the AT, an accounting request message related to the AT to the AGW serving the AT; and
   S408, upon receipt of the accounting request message, the AGW sending an accounting response message to the eBS successfully paged the AT so as to confirm that the accounting request message has been received.

2. The accounting method according to claim 1, wherein the eBS successfully paged the AT starts a timer of a prescribed time length while sending the accounting request message to the AGW, so as to resend the accounting request message to the AGW in case that the accounting response message is not received within the prescribed time length.

3. The accounting method according to claim 2, wherein the eBS successfully paged the AT records the information of the wireless resources occupied by the AT through creating an Air Link Record for the AT.

4. The accounting method according to claim 3, wherein the eBS successfully paged the AT creates the Air Link Record for the AT, and incorporates accounting start field into the accounting request message to be sent to the AGW so as to indicate that the air link has been created.

* * * * *

UNITED STATES PATENT AND TRADEMARK OFFICE
CERTIFICATE OF CORRECTION

PATENT NO.         : 8,107,976 B2                                       Page 1 of 1
APPLICATION NO.    : 12/678972
DATED              : January 31, 2012
INVENTOR(S)        : Wang et al.

It is certified that error appears in the above-identified patent and that said Letters Patent is hereby corrected as shown below:

In the Claims:

Col 10, line 7, delete "S402".

Col 10, line 13, delete "S404".

Col 10, line 16, delete "S406".

Col 10, line 20, delete "S408".

Signed and Sealed this
Third Day of April, 2012

David J. Kappos
*Director of the United States Patent and Trademark Office*